United States Patent
Wei

(10) Patent No.: US 10,084,647 B2
(45) Date of Patent: Sep. 25, 2018

(54) DATA FORWARDING TO SERVER VIA VIRTUAL NETWORK CARD OR TO EXTERNAL NETWORK VIA NETWORK INTERFACE, BASED ON FUSION DESCRIPTOR

(71) Applicant: Hewlett Packard Enterprise Development LP, Houston, TX (US)

(72) Inventor: Chushun Wei, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 68 days.

(21) Appl. No.: 15/031,172

(22) PCT Filed: Oct. 23, 2014

(86) PCT No.: PCT/CN2014/089250
§ 371 (c)(1),
(2) Date: Apr. 21, 2016

(87) PCT Pub. No.: WO2015/058698
PCT Pub. Date: Apr. 30, 2015

(65) Prior Publication Data
US 2016/0277245 A1 Sep. 22, 2016

(30) Foreign Application Priority Data
Oct. 23, 2013 (CN) .......................... 2013 1 0505550

(51) Int. Cl.
*H04L 12/28* (2006.01)
*H04L 12/24* (2006.01)
(Continued)

(52) U.S. Cl.
CPC ...... *H04L 41/0823* (2013.01); *H04L 12/4641* (2013.01); *H04L 12/6418* (2013.01);
(Continued)

(58) Field of Classification Search
None
See application file for complete search history.

(56) References Cited

U.S. PATENT DOCUMENTS 7,502,884 B1* 3/2009 Shah ................... H04L 67/1097
370/395.21
7,746,783 B1 6/2010 Tripathi et al.
(Continued)

FOREIGN PATENT DOCUMENTS

| CN | 1512790 | 7/2004 |
| CN | 101296157 | 10/2008 |
| CN | 102821082 A | 12/2012 |

OTHER PUBLICATIONS

"Simplified, High-Performance 10GbE Networks Based on a Single Virtual Distributed Switch, Managed by VMware vSphere* 5.1", Intel, Nov. 8, 2012.
(Continued)

*Primary Examiner* — Farah Faroul
(74) *Attorney, Agent, or Firm* — Michael A. Dryla

(57) ABSTRACT

A data forwarding device includes server interfaces virtual network cards, a fusion switch and a network interface. A server interface obtains a data frame sent by a virtual network card driver running on a server corresponding to the server interface and obtains a first fusion descriptor, and sends the first fusion descriptor and the data frame to a virtual network card unit that corresponds to the virtual network card driver. The first fusion descriptor includes a type of the descriptor and a length of the data frame. The virtual network card processes the data frame according to the first fusion descriptor, and sends the data frame to the fusion switch. The fusion switch sends the data frame to a corresponding server via a virtual network card, or sends the data frame to an external network via a network interface.

15 Claims, 4 Drawing Sheets

(51) Int. Cl.
*H04L 12/64* (2006.01)
*H04L 12/46* (2006.01)
*H04L 12/66* (2006.01)
*H04L 12/873* (2013.01)
*H04L 29/08* (2006.01)

(52) U.S. Cl.
CPC .............. *H04L 12/66* (2013.01); *H04L 47/52* (2013.01); *H04L 67/1053* (2013.01)

(56) References Cited

U.S. PATENT DOCUMENTS

| | | | |
|---|---|---|---|
| 2002/0143960 A1* | 10/2002 | Goren | H04L 12/4641 709/229 |
| 2003/0200315 A1 | 10/2003 | Goldenberg et al. | |
| 2004/0160903 A1* | 8/2004 | Gai | H04L 12/4645 370/254 |
| 2008/0235757 A1* | 9/2008 | Li | G06F 9/45558 726/1 |
| 2008/0270599 A1 | 10/2008 | Tamir et al. | |
| 2009/0006690 A1* | 1/2009 | Vembu | G06F 13/10 710/113 |
| 2010/0071025 A1 | 3/2010 | Devine et al. | |
| 2010/0118868 A1* | 5/2010 | Dabagh | H04L 49/90 370/389 |
| 2010/0199275 A1* | 8/2010 | Mudigonda | G06F 9/45558 718/1 |
| 2013/0044629 A1 | 2/2013 | Bisvvas et al. | |
| 2013/0138836 A1 | 5/2013 | Cohen et al. | |
| 2013/0145072 A1 | 6/2013 | Venkataraghavan et al. | |
| 2013/0346531 A1* | 12/2013 | Hummel | G06F 13/4022 709/212 |
| 2013/0346645 A1 | 12/2013 | Mayhew | |
| 2014/0304505 A1* | 10/2014 | Dawson | G06F 21/6227 713/165 |
| 2016/0359917 A1* | 12/2016 | Rao | H04L 63/1425 |
| 2016/0371107 A1* | 12/2016 | Puthillathe | G06F 9/45558 |
| 2017/0134273 A1* | 5/2017 | Wang | H04L 45/586 |
| 2017/0134787 A1* | 5/2017 | Wu | H04N 21/41422 |

OTHER PUBLICATIONS

International Search Report and Written Opinion dated Jan. 26, 2015, PCT Patent Application No. PCT/CN2014/089250 filed Oct. 23, 2014, The State Intellectual Property Office, P.R China.

* cited by examiner

DATA FORWARDING TO SERVER VIA VIRTUAL NETWORK CARD OR TO EXTERNAL NETWORK VIA NETWORK INTERFACE, BASED ON FUSION DESCRIPTOR

CLAIM FOR PRIORITY

The present application is a national stage filing under 35 U.S.C § 371 of PCT application number PCT/CN2014/089250, having an international filing date of Oct. 23, 2014, which claims priority to Chinese patent application number 201310505550.4, having a filing date of Oct. 23, 2013, the disclosures of which are hereby incorporated by reference in their entireties.

BACKGROUND

In order to meet requirements of storage and cluster interconnection, a relevant protocol has been developed, so that some existing structures are formed into a unified integrated network structure, to provide seamless access to storage and computing processing resources that are supported by the unified integrated network structure. In a cluster mode, all servers are independently configured with network adapters, or a plurality of blade server units can be inserted in a rack-mounted chassis having a standard height. Each blade server possesses and uses a network card independently.

BRIEF DESCRIPTION OF DRAWINGS

Features of the present disclosure are illustrated by way of example and not limited in the following figures, in which similar numerals indicate similar elements.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In a scene of a cluster of servers, such as blade servers or servers configured with network adapters, network-card resource sharing among different servers can be realized by adopting the present disclosure.

Examples of the present disclosure provides a data forwarding device (also called a network card sharing device) which may be applied to a network system including a plurality of servers and this network card sharing device. Through a plurality of virtual network card units on the network card sharing device and virtual network card drivers running on the servers, a data frame sent by a server is forwarded to an external network or other server(s) via the network card sharing device, which enables a plurality of servers to share network card resources. The virtual network card drivers are in one-to-one correspondence with the virtual network card units.

The network card sharing device may be a newly added device in a network system, or may also be a switching device connecting with various servers in the network system, in which a plurality of virtual network cards are configured.

Figure 1:
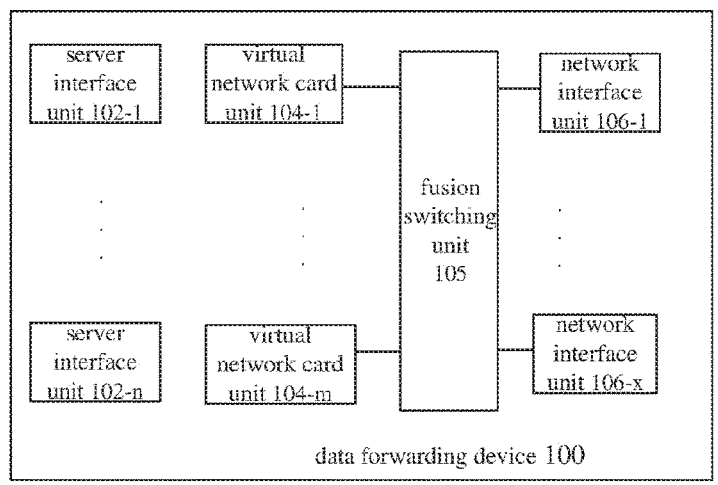
FIG. 1 is an example of a schematic diagram of a data forwarding device according to the present disclosure.

FIG. 1 is an example of a schematic diagram of a data forwarding device according to the present disclosure. The data forwarding device 100 in FIG. 1 includes n server interface units (n server interface units are a server interface unit 102-1, . . . , a server interface unit 102-n respectively, wherein n is an integer greater than 1), m virtual network card units (m virtual network card units are a virtual network card unit 104-1, . . . , a virtual network card unit 104-m respectively, wherein m is an integer greater than 1), a fusion switching unit 105 (the fusion switching unit has a data forwarding function, for example, the fusion switching unit receives a data frame from a virtual network card unit and forwards the data frame to a network interface, or the fusion switching unit receives a data frame from a network interface and forwards the data frame to a virtual network card unit) and x network interface unit(s) (x network interface unit(s) is(are) a network interface unit 106-1, . . . , a network interface unit 106-x, wherein x is an integer greater than or equal to 1), wherein n, m and x may be the same, or two of them may be the same, or each has a different value.

A server interface unit (such as the server interface unit 102-1) is to obtain a data frame to be sent by a virtual network card driver running on a server corresponding to the server interface unit as well as a first fusion descriptor (the first fusion descriptor includes information describing the data frame, and correspondingly the virtual network card unit may process the data frame according to the information in the first fusion descriptor. For example, the information is used to instruct the virtual network card unit to encrypt the data frame), and to send the first fusion descriptor and the data frame to a virtual network card unit that corresponds to the virtual network card driver (the virtual network card unit 104-1 is taken as an example), wherein the first fusion descriptor includes a type of the descriptor and a length of the data frame.

The virtual network card unit 104-1 is to process the data frame according to the fusion descriptor, and to send a processed data frame to the fusion switching unit 105.

The fusion switching unit 105 is to send the processed data frame to a corresponding server via a virtual network card unit (i.e., the virtual network card unit may be the virtual network card unit 104-1 or other virtual network card unit), or to send the processed data frame to an external network via a network interface unit.

As an example, the data forwarding device 100 may further include a queue pool scheduling unit, to schedule the first fusion descriptor and data frame received from the server interface unit to the corresponding virtual network card unit.

Figure 2:
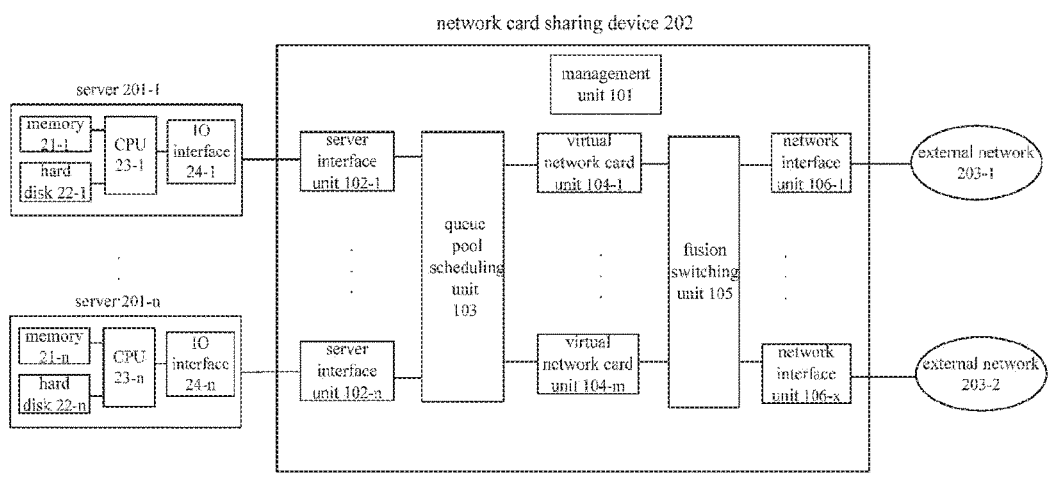
FIG. 2 is an example of a schematic diagram of a resource sharing system according to the present disclosure.

The data forwarding device 100 may be applied to a resource sharing system including a plurality of servers and the data forwarding device 100. Referring to FIG. 2, FIG. 2 is an example of a schematic diagram of a resource sharing system according to the present disclosure. The resource sharing system includes n servers (n servers are a server 201-1, . . . , a server 202-n respectively) and a network card sharing device 202. The data forwarding device may be applied to the network card sharing device 202. The n server interface units in one-to-one correspondence with the n servers are connected with the n servers respectively. The data forwarding device 100 in FIG. 2 further includes a queue pool scheduling unit 103. The resource sharing system may further include an external network(s). As shown in FIG. 2, there are an external network 203-1 and an external network 203-2.

There may be one or a plurality of virtual network card drivers running on each server, and each virtual network card driver has a one-to-one correspondence with each virtual network card unit. The virtual network card units that correspond to the virtual network card drivers running on various servers have different identities.

For example, as shown in FIG. 2, the data forwarding device may also include a management unit 101, and the management unit 101 may be configured to establish a forwarding relationship table, configure queues in the queue pool scheduling unit 103, and so on.

Detailed examples of the present disclosure will be blow by combining with FIG. 2.

The management unit 101 is to establish the forwarding relationship table. E.g., a spanning tree and broadcast mode is adopted to establish MAC forwarding table in Ethernet, while a network login or port login mode is adopted to establish a corresponding relationship in a fiber channel (FC) network. Each network has its own mechanism to make various nodes to send data to each other. The management unit 101 establishes independent forwarding relationship tables for various web formats according to their predetermined mechanisms such as a special protocol frame switch mechanism, an automatic leaning mechanism, a manual configuration mechanism, etc.

As an example, a process that the device receives a data frame sent by a virtual network card driver of a server and performs a fusion switching process on the data frame is specifically as follows.

A server interface unit obtains a data frame to be sent by a virtual network card driver running on a server corresponding to the server interface unit, obtains a first fusion descriptor (e.g., relevant description information for sending the data frame is taken as the first fusion descriptor), and sends the first fusion descriptor and the data frame to the queue an scheduling unit 103.

The first fusion descriptor includes at least a type of the descriptor and a length of the data frame.

The first fusion descriptor may also include one of or any combination of following contents: a frame format of the data frame, whether to add or modify network node ID information, whether to recalculate a checksum, whether to encrypt the data frame, other information for guiding the virtual network card unit on how to process the data frame, wherein the frame format of the data frame instructs the virtual network card unit which one of the frame formats that are supported fusion descriptor to use for sending the data frame.

A high-speed serial IO link that widely used by the server at present has a plurality of point-to-point modes such as a peripheral component interconnection bus interface (PCI Express) mode, a serial rapid input/output interconnect bus (RapidIO) mode, an Ethernet mode, etc.

For these types of server interface units, one server interface unit may be associated with a plurality of queues under cooperation of the servers (specific implementation is described below). The virtual network card driver sends the data frame and the first fusion descriptor to the virtual network card unit via a downlink queue; and the virtual network card driver obtains a second fusion descriptor and a data frame from the virtual network card unit via an uplink queue.

Specific processes of the server interface unit in different link modes are as follows.

(1) When connecting with a corresponding server by a PCI Express point-to-point connection mode, the server interface unit, as a downstream endpoint of a PCI Express link, configures a plurality of sending engines and receiving engines, which are in one-to-one correspondence with queues configured in the queue pool scheduling unit 103.

Specifically, the servers in FIG. 2 may further include memories (such as a memory 21-1 in the server 201-1, . . . , a memory 21-n in the server 201-n), hard disks (such as a hard disk 22-1 in the server 201-1, . . . , a hard disk 22-n in the server 201-n), CPUs (such as a CPU 23-1 in the server 201-1, . . . , a CPU 23-n in the server 201-n), IO interfaces (such as an IO interface 24-1 in the server 201-1, . . . , an IO interface 24-n in the server 201-n), etc. The IO interfaces in the servers are taken as upstream endpoints of the PCI Express links. When any one virtual network card driver running on a server needs to send a data frame, the virtual network card driver puts the data frame into a buffer space of a memory of the server, and set a buffer descriptor in a sending buffer-descriptor circular queue.

Besides a starting address of the buffer space and the length of the data frame, contents of the buffer descriptor includes information for instructing the network card how to send the data frame such as which data frame format the data of the buffer belongs to, whether to add or modify network node ID information, whether to recalculate a checksum, whether the data frame needs to be further encrypted, whether the data frame needs to be sent in a TCP load form. The contents of the buffer descriptor may also include through which one of queues the data frame is sent.

When the virtual network card driver running on the server (the server 201-1 is taken as an example) needs to send a data frame, the corresponding server interface unit (the server interface unit 102-1) reads the data frame from the memory 21-1 of the server 201-1 according to a current valid sending buffer descriptor pointed by a sending engine, and constructs a first fusion descriptor according to the sending buffer descriptor. For example, the contents of the sending buffer descriptor except the starting address of the buffer space are constructed as that of the first fusion descriptor. The server interface unit 102-1 writes the first fusion descriptor and the data frame into a corresponding queue in the queue pool scheduling unit 103.

In specific implementation, there is an address register for each sending engine, and the address register whose initial value is set by driver software points to a buffer descriptor in the sending buffer-descriptor circular queue. The sending engine reads a current buffer descriptor through a PCI Express storage read operation according to an instruction of the address register. When the buffer descriptor is invalid (i.e., there is no data to be sent), the sending engine continues to read a currently pointed buffer-descriptor entry; and When the buffer descriptor is valid, the sending engine is ready to send the data.

When every valid buffer descriptor is read, it is determined that whether a corresponding downlink queue has enough space. When there is enough space, the sending engine writes all or part of information of the buffer descriptor into the downlink queue by a format of the first fusion descriptor, and then the data in the buffer space read through a PCI Express storage read operation is appended to the buffer descriptor. Neither all the information nor part of information of the buffer descriptor includes the starting address of the buffer space.

After the data frame is sent, commonly, an interrupt is raised and an invalid state is written back to the buffer descriptor through the PCI Express storage write operation, so as to indicate that the processing of this buffer descriptor is done. Then its address register is updated automatically to point to next buffer descriptor in the buffer-descriptor circular queue.

(2) When connecting with a corresponding server by an Ethernet point-to-point connection mode, the server interface unit configures a plurality of sending engines and receiving engines that are in one-to-one correspondence with queues configured in the queue pool scheduling unit 103.

When the virtual network card driver running on the server needs to send a data frame, the data frame and a descriptor for sending the data frame are sent to a corresponding server interface unit through an IO interface.

When receiving the descriptor and the data frame from the corresponding server through a sending engine, the server interface unit changes a format of the descriptor sent by the server into the format of a first fusion descriptor, and sends the first fusion descriptor and the data frame to a corresponding queue in the queue pool scheduling unit 103.

When there is the starting address of the buffer space in the descriptor received by the server interface unit and the format of the first fusion descriptor is being changing, the server interface unit removes the starting address of the buffer space included in the descriptor.

(3) When the server interface unit connects with a corresponding server by a serial RapidIO point-to-point connection mode, because the serial RapidIO can work in a similar PCI Express storage read and write operation mode as well as a similar Ethernet message passing mode, implementation in PCI Express or Ethernet may be taken as a reference for obtaining the data frame which is needs to be sent by the virtual network card driver running on the corresponding server, obtaining the relevant description information for sending the data frame as the first fusion descriptor, and sending the first fusion descriptor and the data frame to the queue pool scheduling unit 103.

The queue pool scheduling unit 103 schedules the received first fusion descriptor and data frame to a virtual network card unit corresponding to the virtual network card driver that sends the data frame.

For example, the queue pool scheduling unit 103 may further configures a plurality of queues, and the management unit 101 configures a scheduling policy (e.g., a transmission rate or a priority) and a current state for each queue in the queue pool scheduling unit 103. The queue pool scheduling unit 103 discards part of the data frame or schedules the data frame to the corresponding virtual network card unit according to the configuration for each queue of the management 101.

Figure 3:
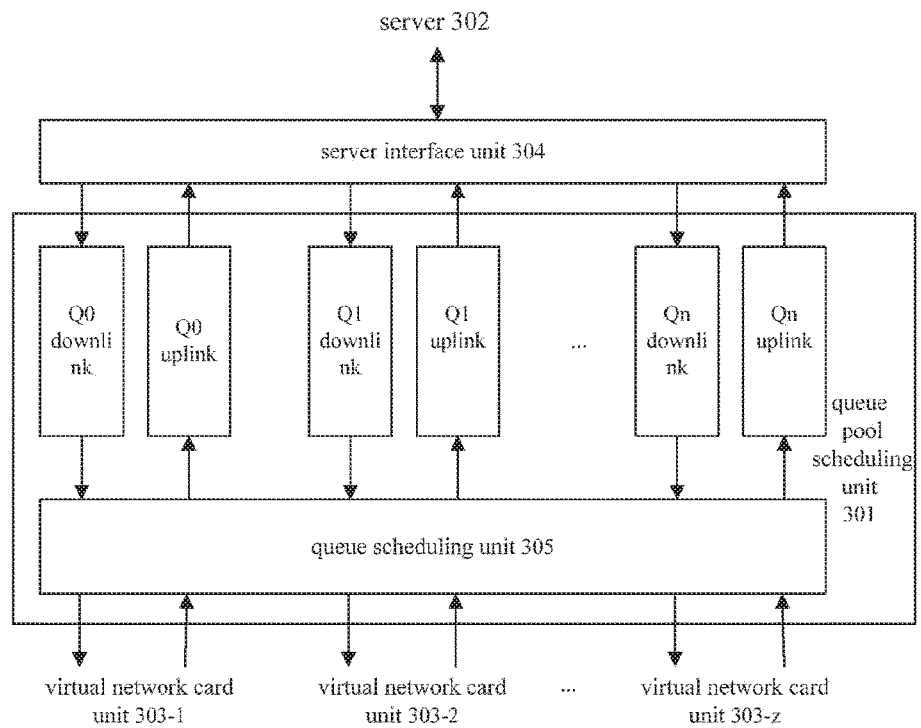
FIG. 3 is an example of a structure diagram of a queue pool scheduling unit according to the present disclosure.

Referring to FIG. 3, FIG. 3 is schematic diagram of the queue pool scheduling unit. In FIG. 3, the queue pool scheduling unit configures a plurality of queues that are divided into a plurality of groups of uplink and downlink queues (they are uplink Q0 and downlink Q0, uplink Q1 and downlink Q1, . . . , uplink Qn and downlink Qn, respectively). Virtual network card driver(s) on the server 302 communicates with the virtual network card unit(s) (they are virtual network card unit 303-1, virtual network card unit 303-2, . . . , virtual network card unit 303-z respectively, wherein z is an integer greater than or equal to 1) through a bidirectional queue pool that consists of a downlink queue and an uplink queue.

A server interface unit 304 may be associated with one or a plurality of groups of uplink and downlink queues. As shown in FIG. 3, the server interface unit 304 is associated with z group(s) of uplink and downlink queues.

Each server interface unit can sense the state of each associated queue, such as usage amount of each uplink or downlink queue, and send information (e.g., an interruption message or a flow control message) to the server according to the preset state for each associated queue.

When a virtual network card driver on the server 302 sends a data frame to the corresponding server interface unit 304, the server interface unit 304 sends the data frame and the first fusion descriptor to the queue scheduling unit 305 through an associated downlink queue, and then the data frame and the first fusion descriptor are scheduled to a corresponding virtual network card unit by the queue scheduling unit 305.

The server interface unit 304 determines which downlink queue associated with it to send the data frame and the first fusion descriptor according to the specific configuration. E.g., each virtual network card driver corresponds to a bidirectional queue and a virtual network card unit; or each sending engine corresponds to a virtual network card driver, a bidirectional queue and a virtual network card.

The virtual network card unit is to process the data frame according to the first fusion descriptor, and encapsulate the data frame by a fusion switching format and send the encapsulated data frame to the fusion switching unit 105.

The virtual network card unit processes the data frame according to the first fusion descriptor in the same way as it processes the data frame according to a common descriptor. The first fusion description in this example of the present disclosure may not include a buffer staring address (i.e., the starting address of the buffer space) that is included in an original common descriptor.

The fusion switching format may be an Ethernet format, a MPLS format, an IP format or a proprietary format defined by the system. The received data frame in a different format is re-encapsulated by a uniform format according to a certain rule, and the data frame in the uniform format may be restored into the format before encapsulation, wherein the uniform format is the fusion switching format mentioned in the example of the present disclosure.

Ethernet switch is widely used, and the Ethernet format is taken as an example of the fusion switch format. An Ethernet switch specified device may be used as the fusion switching unit 105. The Ethernet switch specified device usually judges a destination port of an Ethernet frame by adopting a destination MAC or a destination MAC+VLAN ID, and is able to establish the forwarding table according to a source MAC or a source MAC+VLAN ID though autonomic learning or under the guidance of the management unit 101.

Besides a normal unicast forwarding mechanism, there is another sophisticated mechanism in the Ethernet switch specified device to support broadcast or multicast in a virtual local area network (VLAN). An Ethernet destination MAC address has 48 bits, and the first 24 bits are allocated by IEEE and the last 24 bits are allocated by a network manufacturer. The VLAN ID has 12 bits, which is usually allocated flexibly by the network manufacturer. The present disclosure provides two implementation modes.

In a first mode, the management unit 101 may also be used to configure a network format and a corresponding relationship between a network node ID and a MAC address for each virtual network card unit.

Each virtual network card unit supports one network format, and the network is such as one of Ethernet/FCoE, FC, serial RapidIO, Infiniband, etc. Correspondingly, an associated network node ID is configured, such as an Ethernet MAC address, a port ID of the FC web, a RapidIO node address, a local Infiniband identity (LID), etc.

Each network interface unit supports one network format, and the network is such as one of Ethernet/FCoE, FC, serial RapidIO, Infiniband, etc. Correspondingly, an associated network node ID is configured, such as an Ethernet MAC address, a port ID of FC web, a RapidIO node address, a local Infiniband identity, etc.

When the fusion switching format is the Ethernet format, and the received data frame sent by the queue pool scheduling unit 103 is not an Ethernet data frame, the virtual network card unit may determine a destination MAC address according to the destination network node ID in the data frame, determine a source MAC address according to a source network node ID, and encapsulate the data frame by the Ethernet format according to the destination MAC address and the source MAC address. Specifically, based on the destination network ID corresponding to the data frame and the network format, the virtual network card unit matches a corresponding MAC address in the corresponding relationship configured by the management unit 101, determines the matched MAC address as the destination MAC address, extends the source network node ID to a 48-bit source network node ID which is taken as a source MAC address and encapsulates the data frame by the Ethernet format through utilizing the destination MAC address and the source MAC address.

When encapsulating the data frame by the fusion switching format, the virtual network card unit or the network interface unit may also provide the network format and a source address of the data frame to the management unit 101, so that the management unit 101 establishes the forwarding table of this network format. The network format mentioned in the example of the present disclosure is the frame format of the data frame.

In a second mode, the management unit 101 allocates different VLAN IDs for different network formats, so as to differentiate network formats such as an Ethernet format, an FC format, a RapidIO format, an Infiniband format, etc.

When the fusion switching format is the Ethernet format, and the received data frame sent by the queue pool scheduling unit 103 is not an Ethernet data frame, the virtual network card unit determines a VLAN ID according to the network format of the data frame, determines a destination MAC address according to a destination network node ID corresponding to the data frame, determines a source MAC address according to a source network node ID, and then encapsulates the data frame by the Ethernet format according to the VLAN ID, the destination MAC address and the source MAC address. Specifically, based on the network format of the data frame and the allocation of the management, the virtual network card unit matches a corresponding VLAN ID, extends the source network node ID to a 48-bit source network node ID which is taken as a source MAC address, extends the destination network node ID of the data frame to a 48-bit destination network node ID which is taken as a destination MAC address, and encapsulates the data frame by the Ethernet format through utilizing the destination MAC address, the source MAC address and the matched VLAN ID.

The fusion switching unit 105 looks up in the forwarding relationship table established in the management unit 101 according to an information field of the received data frame in the fusion switching format (e.g., search for an outgoing interface identity), and sends the data frame in the fusion switching format to a virtual network card unit or a network interface unit according to a result found (e.g., the outgoing interface identity) in the forwarding relationship table. This specific implementation may be in the management unit 101.

The forwarding relationship table is established and stored in the management unit 101. The forwarding relationship table may also be established by the management unit 101 and sent to the fusion switching unit 105, and the fusion switching unit 105 forwards the data frame in the fusion switch format just according to this static forwarding relationship table, and works according to a normal Ethernet switching mechanism.

The network interface unit receives the data frame in the fusion switching format sent by the fusion switching unit 105, restores the data frame in the fusion switching format, and then sends the data frame to the external network.

The virtual network card unit receives the data frame in the fusion switching format sent by the fusion switching unit 105, restores the data frame in the fusion switching format, and then processes and sends the data frame to the queue pool scheduling unit 103.

Whether the data frame is sent to the virtual network card unit or the network interface unit is determined by the result found in the forwarding relationship table. When an outgoing interface found in the forwarding relationship table corresponds to a virtual network card unit, the data frame is forwarded to the virtual network card unit; and when the outgoing interface found in the forwarding relationship table corresponds to an network interface unit, the data frame is forwarded to the network interface unit and.

As another example, a process that the device receives a data frame sent by an external network and forwards the data frame to the server is specifically as follows.

A network interface unit receives a data frame sent by an external network, and encapsulates the data frame by the fusion switching format and sends the data frame in the fusion switching format to the fusion switching unit 105.

The fusion switching format may be an Ethernet format, a MPLS format, an IP format or a proprietary format defined by the system. The received data frame in a different format is re-encapsulated by a uniform format according to a certain rule, and the data frame in the uniform format may be restored into the format before encapsulation, wherein the uniform format is the fusion switching format mentioned in the example of the present disclosure.

Ethernet switch is widely used, and the Ethernet format is taken as an example of the fusion switch format. An Ethernet switch specified device may be used as the fusion switching unit 105. The Ethernet switch specified device usually judges a destination port of an Ethernet frame by adopting a destination MAC or a destination MAC+VLAN ID, and is able to establish the forwarding table according to a source MAC or a source MAC+VLAN ID though autonomic learning or under the guidance of the management unit 101. Besides a normal unicast forwarding mechanism, there is another sophisticated mechanism in the Ethernet switch specified device to support broadcast or multicast in a VLAN. An Ethernet destination MAC address has 48 bits, and the first 24 bits are allocated by IEEE and the last 24 bits are allocated by a network manufacturer. The VLAN ID has 12 bits, which is usually allocated flexibly by the network manufacturer. The present disclosure provides two implementation modes.

First, the management unit 101 configures a network format and a corresponding relationship between a network node ID and a MAC address for each virtual network card unit.

Each virtual network card unit supports one network format, such as the Ethernet format, the FCoE format, the FC format, the serial RapidIO format, or the Infiniband format, etc. Correspondingly, an associated network node ID is configured, such as the Ethernet MAC address, the port ID of FC web, the RapidIO node address, the local Infiniband identity, etc.

When the fusion switching format is the Ethernet format, and the received data frame sent by the external network is not an Ethernet data frame, based on the destination network ID corresponding to the data frame and the network format, the network interface unit matches a corresponding MAC address in the corresponding relationship configured by the management unit 101, extends the source network node ID to a 48-bit source network node ID which is taken as a source MAC address, uses the matched MAC address as a destination MAC address, and encapsulates the data frame by the Ethernet format through utilizing the destination MAC address and the source MAC address.

When encapsulating the data frame by the fusion switching format, the virtual network card unit or the network interface unit may also provide the network format and the source address of the data frame to the management unit 101, so that the management unit 101 establishes the forwarding table of this network format. The network format mentioned in the example of the present disclosure is the frame format of the data frame.

Second, the management unit 101 allocates different VLAN IDs for different network formats.

When the fusion switching format is the Ethernet format, and the received data frame sent by the external network is not an Ethernet data frame, based on the network format of the data frame and the allocation of the management, the network interface unit matches a corresponding VLAN ID, extends the source network node ID to a 48-bit source network node ID which is taken as a source MAC address, extends the destination network node ID of the data frame to a 48-bit destination network node ID which is taken as a destination MAC address, and encapsulates the data frame by the Ethernet format through utilizing the destination MAC address, the source MAC address and the matched VLAN ID.

When receiving the data frame in fusion switching format, the fusion switching unit 105 looks up in the forwarding relationship table established in the management unit 101 according to an information field of the received data frame in the fusion switching format, and sends the data frame in the fusion switching format to a virtual network card unit or a network interface unit according to a result found in the forwarding relationship table. This may be implemented through the management unit 101.

The forwarding relationship table is established and stored in the management unit 101. The forwarding relationship table may also be established by the management unit 101 and sent to the fusion switching unit 105, and the fusion switching unit 105 forwards the data frame in the fusion switch format just according to this static forwarding relationship table, and works according to the normal Ethernet switching mechanism.

Upon receiving the data frame in the fusion switching format sent by the fusion switching unit 105, the virtual network card unit restores the data frame in the fusion switching format, further processes the restored data frame, constructs a second fusion descriptor for the data frame according to a processed result, and then sends the data frame and the constructed second fusion descriptor to the queue pool scheduling unit 103.

The second fusion descriptor includes at least a type of the descriptor and a length of the data frame.

The second fusion descriptor may also include one of or any combination of following contents: a frame format of the data frame, whether there is an error, a judging result of the field of the data frame from the virtual network card unit, information of the data frame extracted or discarded by the virtual network card unit, modification of the data frame performed by the virtual network card unit, whether the virtual network card unit completes decryption, other information discovered or has been processed by the virtual network card unit.

The queue pool scheduling unit 103 schedules the second fusion descriptor and the data frame to a corresponding server interface unit, wherein the server interface unit corresponds to a server on which a virtual network card driver corresponding to the virtual network card unit that sends the second fusion descriptor runs.

For example, the queue pool scheduling unit 103 may further configures a plurality of queues, and the management unit 101 configures a scheduling policy (e.g., a transmission rate and/or a priority) and a current state for each queue in the queue pool scheduling unit 103. The queue pool scheduling unit 103 discards part of the data frame or schedules the data frame to the corresponding virtual network card unit according to the configuration for each queue of the management unit 101.

Specifically, as shown in FIG. 3, the queue pool scheduling unit 301 may schedule the data frame and the second fusion descriptor to the corresponding server interface unit 304 through a corresponding uplink queue.

The server interface unit writes the obtained data frame to its corresponding server, and sends the contents of the second fusion descriptor to the server, so that a corresponding virtual network card driver running on the server processes the received data frame according to the received contents of the second fusion descriptor.

A high-speed serial IO link that widely used by the server at present has a plurality of point-to-point modes such as a PCI Express mode, a serial RapidIO mode, an Ethernet mode, etc. Specific processes of the server interface unit in different link modes are as follows.

(1) When connecting with the server by the PCI Express point-to-point connection mode, the server interface unit, as the downstream endpoint of the PCI Express link, configures a plurality of receiving engines that are in one-to-one correspondence with queues of the queue pool scheduling unit 103.

A receiving engine actively moves the data frame in the uplink queue to a buffer space in a memory of the server, which is similar to a general network data receiving mechanism.

The virtual network card driver running on the server needs to reserve one or a plurality of groups of buffer spaces. Correspondingly, a group of buffer descriptors is configured in a receiving buffer-descriptor circular queue or configured in a plurality of receiving buffer-descriptor circular queues. It is adopted by a common network card and will not be described herein. Each buffer descriptor includes information such as a buffer idle identity, a starting address of the buffer space, a length of the buffer, etc., and may also further include through which one of queues the data frame is received.

The server interface unit reads a current valid receiving buffer descriptor from the corresponding server. When there are the data frame and the second fusion descriptor in a queue corresponding to the receiving engine, the server interface unit reads the second fusion descriptor, reads the subsequent data frame according to the second fusion descriptor, writes the data frame into a buffer of a server pointed by the receiving buffer descriptor, and further carries the contents of the second fusion descriptor when writing back the receiving buffer descriptor.

In specific implementation, the receiving engine has an address register that points to a buffer descriptor of the buffer-descriptor circular queue. An initial value of the address register is set by driver software. The receiving engine reads a current buffer descriptor through a PCI Express storage read operation according to an instruction of the address register. When the buffer descriptor is invalid (i.e., a non-idle descriptor), the receiving engine continues to read a currently pointed buffer descriptor. When the buffer descriptor is valid (i.e., an idle descriptor), the receiving engine is ready to receive the data.

When every valid buffer descriptor is read, it is determined that whether a corresponding uplink queue has a data frame to be read. When there is a data frame, the receiving engine reads a second fusion descriptor first, and then reads the data frame appended to the second fusion descriptor according to the second fusion descriptor, and writes the data frame into a buffer space of a memory of the server pointed by the buffer descriptor through a PCI Express storage write operation.

After the data frame is received, commonly, an interrupt is raised and the buffer descriptor is written back through the PCI Express storage write operation, so as to indicate that the processing of this buffer descriptor is done and the corresponding buffer is in non-idle state. The buffer descriptor written back further carries all or part of information of the second fusion descriptor, and then its address register is updated automatically to point to next buffer descriptor.

(2) When connecting with a corresponding server by the Ethernet point-to-point connection mode, the server interface unit configures a plurality of receiving engines that are in correspondence with queues of the queue pool scheduling unit 103.

When there are a data frame and a second fusion description in a queue corresponding to the receiving engine, the server interface unit reads the second fusion descriptor, reads the subsequent data frame according to the second fusion descriptor, and sends the second fusion descriptor and the data frame to the corresponding server, so that a corresponding virtual network card driver running on the server further processes the second fusion descriptor and the data frame.

The corresponding virtual network card driver running on the server further processes the received data frame according to the received second fusion descriptor, wherein the virtual network card driver corresponds to the virtual network card unit that sends the data frame.

For example, the second fusion descriptor format may be different from the descriptor format of a data frame received by a server IO interface, and the corresponding virtual network card driver running on the server processes the received data frame by combining the two descriptors.

For another example, it points out which virtual network card driver needs to receive the data frame such as by a VLAN tag carried in the second fusion descriptor or a VLAN tag added in the Ethernet data frame, so that the server associates with one of a plurality of virtual network card drivers.

(3) When the server interface unit connects with a corresponding server by a serial RapidIO point-to-point connection mode, because the serial RapidIO can work in a similar PCI Express storage read and write operation mode as well as a similar Ethernet message passing mode, implementation in PCI Express or Ethernet may be taken as a reference for sending the data frame and the content of the second fusion descriptor to the server corresponding to the server interface unit, to make the corresponding virtual network card driver running on the server process the received data frame according to the received second fusion descriptor.

The network interface unit receives the data frame in the fusion switching format of the fusion switching unit 105, restores the data frame in the fusion switching format, and sends the restored data frame to the external network.

Whether the data frame is sent to the virtual network card unit or the network interface unit is determined by the result found in the forwarding relationship table. When an outgoing interface found in the forwarding relationship table corresponds to a virtual network card unit, the data frame is forwarded to the virtual network card unit; and when the outgoing interface found in the forwarding relationship table corresponds to an network interface unit, the data frame is forwarded to the network interface unit.

The implementation of the first fusion descriptor and the second fusion descriptor is detailed as below.

The first fusion descriptor which usually includes at least the type of the descriptor and the length of the data frame, instructs the virtual network card unit how to send a data frame.

The first fusion descriptor may also include specific information, as follows:

the frame format of the data frame, also called a network format, e.g., the Ethernet format, the FC format, an internet small computer system interface (iSCSI) format, the RapidIO format, a multiple concurrent interconnect bus (Infiniband) format, a remote direct memory access (RDMA) format, etc.;

whether to add or modify network node ID information, e.g., an Ethernet MAC address, the VLAN tag, etc.;

whether to recalculate a checksum, e.g., an Ethernet FCS, a checksum of an IP header, a TCP checksum, a UDP checksum, etc.;

whether to encrypt the data frame, e.g., IPSec security alliance information etc.; and other information for guiding the virtual network card unit on how to process the data frame.

To show sending and receiving characteristics of various networks more clearly and concisely, there is more than one type of the first fusion descriptor.

The first fusion descriptor may uniformly define a plurality of distinguishable formats. For example, two formats are defined for the Ethernet and FCoE, one format is defined for the RapidIO, one format is defined for Infiniband, one format is defined for RDMA, and so on.

For example, an extension type is further defined based on a 64-bit common descriptor. The common sending descriptor is suitable for data sending in common Ethernet. Various extension sending descriptors are suitable for other frame formats or to instruct the virtual network card to share more functions.

(1) The common sending descriptor is suitable for data sending in the common Ethernet. The contents included in the first fusion descriptor which is suitable for data sending in the common Ethernet are shown in table 1.

TABLE 1

| 63-48 | 47-40 | 39-32 | 31-24 | 23-16 | 15-0 |
|---|---|---|---|---|---|
| VLAN | HEADLEN | MACLEN | CMD | RSV | Length |

In table 1, Length: a length of data to be sent;

MACLEN: to indicate a length of MAC header+VLAN, so that the virtual network card calculates the checksum of the IP header;

HEADLEN: to indicate a length of the IP header, so that the virtual network card calculates the checksum of the IP header;

VLAN: to provide 802.1q/802.1ac tag information; and

CMD: Command Byte, which is further extended and the contents are shown in table 2.

TABLE 2

| 7 | 6 | 5 | 4 | 3 | 2 | 1 | 0 |
|---|---|---|---|---|---|---|---|
| DEXT | VLE | RSV | RSV | IXSM | TXSM | IFCS | EOP |

In table 2, DEXT: Descriptor extension identity, and 1'b0 represents non-extended (i.e., the common descriptor) and 1'b1 represents extension;

VLE: VLAN Packet Enable (VLAN enabled), which means that a VLAN tag needs to be added when the frame is sent;

TXSM: to instruct the virtual network card to add a TCP/UDP checksum;

IXSM: to instruct the virtual network card to add an IP checksum;

IFCS: Insert FCS, which means that an Ethernet FCS field needs to be added;

EOP: End of Packet, which corresponds to a last descriptor of a frame; and

RSV: reserved and unused.

(2) One of extension sending descriptors is suitable for data sending in enhanced Ethernet and FCoE. The contents included in the first fusion descriptor which is suitable for data sending in the enhanced Ethernet and FCoE are shown in table 3.

TABLE 3

| 63-48 | 47-40 | 39-32 | 31-24 | 23-16 | 15-0 |
|---|---|---|---|---|---|
| VLAN Ipsec SA IDX | HEADLEN L4LEN | MACLEN RSV | CMD ECMD | ETYPE FCoEF | Length MSS |

In table 3, Length: a length of data to be sent;

MACLEN: to indicate a length of MAC header+VLAN for a non-FCoE frame so that the virtual network card calculates the checksum of the IP header, or to indicate a length of MAC header+VLAN+FCoE header so that the virtual network card performs FC-CRC calculation;

HEADLEN: to indicate a length of the IP header for an IP frame so that the virtual network card calculates the checksum of the IP header, or to indicate a length of a FCoE header for an FCoE frame including a length of MAC header+VLAN+FCoE header+FC header;

VLAN: to provide 802.1q/802.1ac tag information; and

L4LEN: a length of a L4 header;

Ipsec SA IDX: an IPsec SA Index, which indicates an entry in a security alliance table, so that the virtual network card performs encryption by adopting a corresponding secret key;

MSS: a Maximum Segment Size, e.g., the maximum number of segment bytes of a TCP and FCoE frame;

ETYPE: type encoding of the extension descriptor, e.g., 8'h02 is one of the extension descriptors;

FCoEF: to instruct the virtual network card unit how to add E-SOF and E-EOF to the FCoE frame; and CMD: Command Byte, which is further extended and the specific contents are shown in table 4.

TABLE 4

| 7 | 6 | 5 | 4 | 3 | 2 | 1 | 0 |
|---|---|---|---|---|---|---|---|
| DEXT | VLE | FCoE | RSV | IXSM | TXSM | IFCS | EOP |

In table 4, DEXT: Descriptor extension identity, and 1'b0 represents non-extended, and 1'b1 represents extension (the descriptor is set to 1'b1);

VLE: VLAN Packet Enable (VLAN enabled), which means that a VLAN tag needs to be added when the frame is sent;

FCoE: to instruct the virtual network card whether to process according to a FCoE frame or a non-FCoE frame;

TXSM: to instruct the virtual network card to add a TCP/UDP checksum;

IXSM: to instruct the virtual network card to add an IP checksum;

IFCS: Insert FCS, which means that an Ethernet FCS field needs to be added; and

EOP: End of Packet, which corresponds to a last descriptor of a frame.

ECMD in table 3: Extension Command Byte, which is further extended and the specific contents are shown in table 5.

TABLE 5

| 7 | 6-5 | 4 | 3 | 2 | 1 | 0 |
|---|---|---|---|---|---|---|
| TSE | L4T | IPV4 | Encrypt | IPSEC_TYPE | RSV | RSV |

In table 5, TSE: to instruct the virtual network card to start a TCP and FCoE frame segment if needed;

L4T: L4 load types (00: UDP; 01: TCP; 10: SCTP; 11: RSV);

IPV4: IP package types (1: IPv4; 0: IPv6);

Encrypt: to instruct the virtual network card whether to start IPSec encryption; and IPSEC_TYPE: whether it is ESP or HA.

(3) Another extension sending descriptor is suitable for RDMA operation. The contents included in the first fusion descriptor which is suitable for the RDMA operation are shown in table 6.

TABLE 6

| 63-40 | 39-32 | 31-24 | 23-16 | 15-0 |
|---|---|---|---|---|
| RSV | SEQ | CMD | ETYPE | Length |
| | | Source Node ID | | |
| | | Source Memory Address | | |
| | | Remote Node ID | | |
| | | Remote Memory Address | | |

In table 6, Length: a length of data to be sent, e.g., a data length of DMA;

SEQ: serial numbers, which recodes connecting operation numbers;

Source Node ID: a local node ID and an IP+TCP port number;

Source Memory Address: a 64-bit physical memory address of a local server and a starting address of DMA;

Remote Node ID: a remote node ID and an IP+TCP port number;

Remote Memory Address: a 64-bit physical memory address of a remote server and a starting address of DMA;

ETYPE: type encoding of the extension descriptor, e.g., 8'h03 is another extension descriptor; and CMD: Command Byte, which is further extended and the contents are shown in table 7.

TABLE 7

| 7 | 6 | 5 | 4 | 3 | 2 | 1 | 0 |
|---|---|---|---|---|---|---|---|
| DEXT | VLE | TCP/ETH | WE/RD | TOE | RSV | IFCS | RSV |

In table 7, DEXT: Descriptor extension identity, and 1'b0 represents non-extended, and 1'b1 represents extension (the descriptor is set to 1'b1);

VLE: VLAN Packet Enable (VLAN enabled), which means that a VLAN tag needs to be added when the frame is sent;

TCP/ETH: to indicate to the virtual network card whether it is RDMA over TCP or RDMA over Ethernet;

WE/RD: to indicate whether it is RDMA read operation or RDMA write operation;

TOE: to instruct the virtual network card to execute a TCP protocol stack; and

IFCS: Insert FCS, which means that an Ethernet FCS field needs to be added.

The second fusion descriptor, usually including at least the length of a data frame and the type of the second fusion descriptor, means some information that is discovered by the virtual network card unit when receiving the data frame. The second fusion descriptor may also include specific information, as follows:

the frame format of the data frame, e.g., the Ethernet format, the FC format, the iSCSI format, the RapidIO format, the Infiniband format, the RDMA format, etc.;

whether there is an error, e.g., there is an error checksum, the length of the data frame is abnormal, etc.;

whether the virtual network card has stripped some fields of the data frame, e.g., FCS of the Ethernet frame etc.;

whether the virtual network card has completed the decryption, e.g., IPSec etc.;

whether the virtual network card has extracted some fields, e.g., a VLAN tag of the Ethernet frame, a five-element information of an IP packet, etc.; and other information such as a judging result of the field of the data frame from the virtual network card unit, modification of the data frame performed by the virtual network card unit, and so on.

To show sending and receiving characteristics of various networks more clearly and concisely, there is more than one type of the second fusion descriptor.

The second fusion descriptor may uniformly define a plurality of distinguishable formats. For example, two formats are defined for Ethernet and FCoE, one format is defined for RapidIO, one format is defined for Infiniband, one format is defined for RDMA, and so on. For example, an extension type is further defined based on a 64-bit common descriptor. The common receiving descriptor is suitable for data receiving in common Ethernet. Various extension sending descriptors are suitable for other frame formats or to instruct the virtual network card to share more functions.

(1) The common receiving descriptor is suitable for data receiving in the common Ethernet. The contents included in the second fusion descriptor which is suitable for data receiving in the common Ethernet are shown in table 8.

TABLE 8

| 63-48 | 47-40 | 39-32 | 31-24 | 23-16 | 15-0 |
|---|---|---|---|---|---|
| VLAN Tag | Errors | RSV | Status | RSV | Length |

In table 8, Length: a length of received data;

VLAN: extracted 802.1q/802.1ac tag information; and

Status: bytes of status information, which is further extended and the contents are shown in table 9.

TABLE 9

| 7 | 6 | 5 | 4 | 3 | 2 | 1 | 0 |
|---|---|---|---|---|---|---|---|
| PIF | IPCS | L4CS | UDPCS | VP | EOP | SOP | DEXT |

In table 9, DEXT: Descriptor extension identity, and 1'b0 represents non-extended (the descriptor is set to 1'b0) and 1'b1 represents extension;

VP: VLAN Packet, which indicates whether an input frame carries a VLAN tag;

IPCS: Ipv4 Checksum, which indicates that the IP header has been checked, and a result is in IPE;

L4CS: L4 Checksum, which indicates that L4 has been checked, and a result is in L4E;

UDPCS: UDP Checksum, which indicates whether L4 check has been completed by UDP or TCP;

PIF: Non Unicast Address, which indicates whether MAC of the input frame is unicast;

EOP: End of Packet, which corresponds to the last descriptor of a frame; and

SOP: Start of Packet, which corresponds to the first descriptor of the frame.

Errors in table 8: bytes of error information, which is further extended and the contents are shown in table 10.

TABLE 10

| 7 | 6 | 5 | 4 | 3 | 2 | 1 | 0 |
|---|---|---|---|---|---|---|---|
| IPE | L4E | RSV | RSV | RSV | RSV | RSV | RXE |

In table 10, IPE: Ipv4 Checksum Error (the check result of the IP header);

L4E: a L4 check result, e.g., a TCP/UDP Checksum Error; and

RXE: other Ethernet frame error(s), e.g., a CRC error, a link error, and/or various length errors.

RSV in table 8 means reserved and unused.

(2) One of extension receiving descriptors is suitable for data receiving in enhanced Ethernet and FCoE. The contents included in the second fusion descriptor which is suitable for data receiving in the enhanced Ethernet and FCoE are shown in table 11.

TABLE 11

| 63-48 | 47-40 | 39-32 | 31-24 | 23-16 | 15-0 |
|---|---|---|---|---|---|
| VLAN Tag | Errors | Ext. Status | Status | ETYPE | Length |
| Packet Type | HDR_LEN | Ext. Errors | FCoE_PARAM/Fragment Checksum/RSS Hash/RSS TYPE | | |

In table 11, Length: a length of received data;

ETYPE: the type encoding of the extension descriptor, e.g., 8'h01 is one of the extension descriptors;

VLAN: the extracted 802.1q/802.1ac tag information; and

Status: bytes of status information, which is further extended and the contents are shown in table 12.

TABLE 12

| 7 | 6 | 5 | 4 | 3 | 2 | 1 | 0 |
|---|---|---|---|---|---|---|---|
| PIF | IPCS/ FCEOFs | L4CS/ FCSTAT [1] | UDPCS/ FCSTAT [0] | VP | EOP | SOP | DEXT |

In table 12, DEXT: Descriptor extension identity, and 1'b0 represents non-extended and 1'b1 represents extension (the descriptor is set to 1'b1);

VP: VLAN Packet, which indicates whether an input frame carries a VLAN tag;

IPCS: Ipv4 Checksum, which indicates that the IP header has been checked, and the result is in IPE;

L4CS: L4 Checksum, which indicates that L4 has been checked, and the result is in L4E;

UDPCS: UDP Checksum, which indicates whether L4 check has been completed by UDP or TCP;

PIF: Non Unicast Address, which indicates whether MAC of the input frame is unicast;

EOP: End of Packet, which corresponds to the last descriptor of a frame; and

SOP: Start of Packet, which corresponds to the first descriptor of the frame.

FCSTAT: FCoE Status, e.g., a FC state of the FCoE frame; and

FCEOFs: to represent the status of EOF/SOF series together with FCEOFe of the error information.

In table 11, Ext. Status: extension bytes of status information, which is further extended and the contents are shown in table 13.

TABLE 13

| 7 | 6 | 5 | 4 | 3 | 2 | 1 | 0 |
|---|---|---|---|---|---|---|---|
| SECP | UDPV | VEXT | RSV | RSV | RSV | RSV | RSV |

In table 13, SECP: IPSec hits and processes SA;

UDPV: UDP Checksum Valid, which means that the received frame is UDP, and there is a nonzero checksum, and the Fragment Checksum field is valid; and VEXT: double VLAN frames.

In table 11, Errors: error information bytes, which is further extended and the contents are shown in table 14.

TABLE 14

| 7 | 6 | 5 | 4 | 3 | 2 | 1 | 0 |
|---|---|---|---|---|---|---|---|
| IPE/ FCEOFe | L4E | RSV | RSV | FCERR | | | RXE |

In table 14, IPE: Ipv4 Checksum Error (the check result of the IP header);

FCEOFe: to represent the status of EOF/SOF series together with FCEOFs of the status information;

L4E: a L4 check result, e.g., a TCP/UDP Checksum Error;

RXE: other Ethernet frame error(s), e.g., a CRC error, a link error, and/or various length errors; and FCERR: an FCoE error code, and by definition, 3'b000 represents no error and 3'b001 represents an error FC CRC.

In table 11, Ext. Errors: extension bytes of error information, which is further extended and the contents are shown in table 15.

TABLE 15

| 7 | 6 | 5 | 4 | 3 | 2 | 1 | 0 |
|---|---|---|---|---|---|---|---|
| RSV | RSV | RSV | SECERR | | | RSV | |

In table 15, SECERR: an IPSec error code, and by definition, 3'b000 represents no error, 2'b001 represents no hits on SA and 2'b010 represents an abstract error.

In table 11, HDR_LEN: a length of a header part, and a different frame type has a different length.

Packet Type: an identified frame type, divided into L2 or non-L2, which is further extended and the contents are shown in table 16.

TABLE 16

| 15 | 14-10 | 9 | 8 | 7 | 6 | 5 | 4 | 3 | 2 | 1 | 0 |
|---|---|---|---|---|---|---|---|---|---|---|---|
| 0 = L3 | RSV | IPV4 | IPV4E | IPV6 | IPV6E | TCP | UDP | SCTP | NFS | IPSec ESP | IPSec AH |
| 1 = L2 | RSV | 802.1x | RSV | FCoE | RSV | RSV | RSV | RSV | RSV | RSV | RSV |

In table 11, FCoE_PARAM: extracted some FCoE parameters for the FCoE frame;

RSS Hash/RSS TYPE: some fields of HASH, so that one of multi-core CPUs is allocated; and Fragment Checksum: this field is valid for the UDP frame when UDPV is valid in the status information.

(3) Another extension receiving descriptor is suitable for RDMA read operation. The contents included in the second fusion descriptor which is suitable for the RDMA operation are shown in table 17.

TABLE 17

| 63-48 | 47-40 | 39-32 | 31-24 | 23-16 | 15-0 |
|---|---|---|---|---|---|
| VLAN | SEQ | Errors | Status | ETYPE | Length |
| | | Source Node ID | | | |
| | | Source Memory Address | | | |
| | | Remote Node ID | | | |
| | | Remote Memory Address | | | |

In table 17, Length: a length of received data;

ETYPE: the type encoding of the extension descriptor, e.g., 8' h03 is another extension descriptor;

VLAN: extracted 802.1q/802.1ac tag information;

SEQ: serial numbers, which recodes connecting operation numbers;

Source Node ID: a local node ID and an IP+TCP port number;

Source Memory Address: a 64-bit physical memory address of a local server and a starting address of DMA;

Remote Node ID: a remote node ID and an IP+TCP port number;

Remote Memory Address: a 64-bit physical memory address of a remote server and a starting address of DMA; and Status: bytes of status information, which is further extended and the contents are shown in table 18.

TABLE 18

| 7 | 6 | 5 | 4 | 3 | 2 | 1 | 0 |
|---|---|---|---|---|---|---|---|
| RSV | IPCS | L4CS | RSV | VP | EOP | SOP | DEXT |

In table 18, DEXT: Descriptor extension identity, and 1'b0 represents non-extended (the descriptor is set to 1'b0) and 1'b1 represents extension;

VP: VLAN Packet, which indicates whether an input frame carries a VLAN tag;

IPCS: Ipv4 Checksum, which indicates that the IP header has been checked, and the result is in IPE;

L4CS: L4 Checksum, which indicates that L4 has been checked, and the result is in L4E;

EOP: End of Packet, which corresponds to the last descriptor of a frame; and

SOP: Start of Packet, which corresponds to the first descriptor of the frame.

Errors in table 17: bytes of error information, which is further extended and the contents are shown in table 19.

TABLE 19

| 7 | 6 | 5 | 4 | 3 | 2 | 1 | 0 |
|---|---|---|---|---|---|---|---|
| IPE | L4E | RSV | RSV | RSV | RSV | RSV | RXE |

In table 19, IPE: Ipv4 Checksum Error (the check result of the IP header);

L4E: a L4 check result, e.g., a TCP Checksum Error; and

RXE: other Ethernet frame error(s), e.g., a CRC error, a link error, and/or various length errors.

The contents in different formats included in the first fusion descriptor and the second fusion descriptor are listed above. In specific implementation, the contents in the first fusion descriptor or in the second fusion descriptor may be reduced, or may also be added in the reserved field. However, in contrast to the implementation of various current network adapters, neither the fusion descriptor nor the second fusion descriptor include the starting address of the buffer space (i.e., it is not associated with an TO address of the CPU of the server).

Further, a virtual running environment of a plurality of VMs on each physical server is implemented by virtue of a virtual machine manager (VMM), to provide each VM with a virtualized CPU, a virtualized memory, a virtualized storage, a virtualized network card, etc. Hence, there is one or a plurality of virtual network card drivers running on each VM, and each virtual network card driver is in one-to-one correspondence with the virtual network card unit.

When a virtual network card driver running on the VM needs to send a data frame, the server interface unit obtains the data frame from the virtual network card driver, obtains the relevant description information for sending the data frame as the first fusion descriptor, and send the first fusion descriptor and the data frame to the queue pool scheduling unit 103.

When a server interface unit needs to send a data frame to a VM, the server interface unit sends the data frame to the VM, on which a virtual network card driver which corresponds to a virtual network card unit that sends the data frame runs, so that the corresponding virtual network card driver running on the VM processes the received data frame according to the received contents of the second fusion descriptor.

The process of obtaining the data frame to be sent from the server is the same as the previous example. When there are a plurality of virtualized VMs, the data frame and the descriptor are just obtained from a corresponding VM. When the data frame and the descriptor are written into the server, the data frame and the descriptor can be written into the corresponding VM.

When a VM migrates from a source server to a destination server, the virtual network card driver(s) needs to be run on the destination server, and one-to-one corresponding relationship between the virtual network card driver and the virtual network card unit needs to be established. The virtual network card driver passes a message to the virtual network card unit by a queuing manner, the first fusion descriptor and the second fusion descriptor are not associated with the IO address of the CPU, and a correlation between the VM and the network card is greatly reduced, so the migration of the VM can easily be achieved.

A process of the migration of the VM is specifically as below.

(1) A sending function of the virtual network card driver on the migrated VM will be disabled on the server.

(2) When learning the migration of any one VM (i.e., the sending function of the virtual network card driver on the migrated VM is disabled), the management unit 101 disables a function of receiving the data frame sent by the external network on the virtual network card unit that corresponds to the virtual network card driver running on the VM, and make the queue pool scheduling unit 103 complete the sending and receiving of the data frame.

(3) The server copies a software scene of a source VM into a same operation system of a destination VM. The management unit 101 copies related content (e.g., configuration information) of the virtual network card unit of which the receiving function is disabled into a destination virtual network card unit and a destination fusion switching unit. The destination virtual network card unit corresponds to a virtual network card driver running on the migrated VM.

(4) The server launches the virtual network card driver on the migrated VM. When the virtual network card driver on the migrated VM is launched, the management unit 101 starts the sending and receiving function of the destination virtual network card unit.

To enhance the function of the device, the device may also include a sharing acceleration unit(s) (also called an acceleration unit(s) for short).

When receiving a data frame sent by a sever which runs a sharing device driver corresponding to a sharing acceleration unit, the sharing acceleration unit processes the data frame and returns a processed result to the server that sends the data frame.

When the sharing acceleration unit is with a network communication function, the processed result is sent to the fusion switching unit 105 or sent to the server that sends the data frame.

Figure 4:
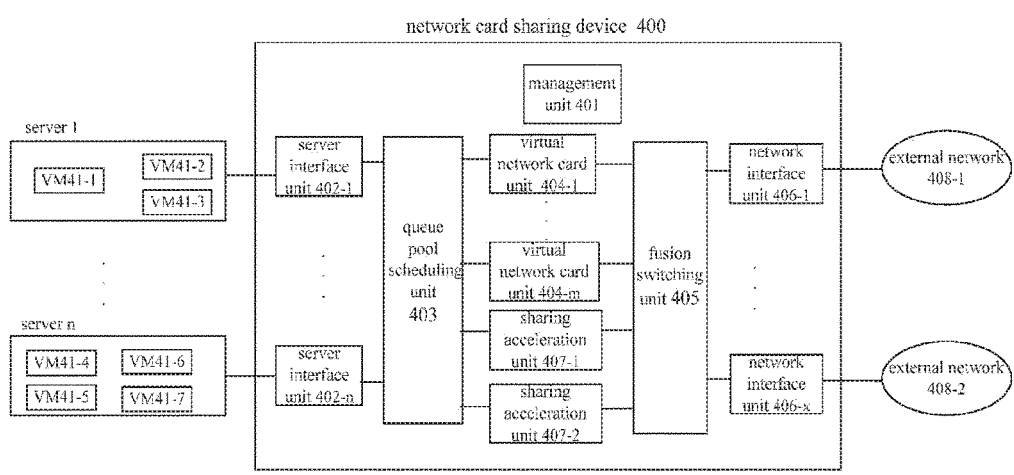
FIG. 4 is an example of a schematic diagram of a resource sharing system in which VMs are hosted on servers according to the present disclosure.

Referring in FIG. 4, FIG. 4 is an example of a schematic diagram of a resource sharing system in which VMs are hosted on the servers according to the present disclosure. There are n servers shown in FIG. 4: a server 1, . . . , a server n, respectively. An exemplar virtualized environment is described, in which 3 VMs are hosted on the server 1 (these 3 VMs are a VM 41-1, a VM 41-2 and a VM 41-3 respectively) and 4 VMs (these 4 VMs are a VM 41-4, a VM 41-5, a VM 41-6 and a VM 41-7 respectively) are hosted on the server n. A network card sharing device 400 in FIG. 4 includes a management unit 401, n server interface units (n server interface units are a server interface unit 402-1, . . . , a server interface unit 402-n respectively, wherein n is an integer greater than 1), m virtual network card units (m virtual network card units are a virtual network card unit 404-1, . . . , a virtual network card unit 404-m respectively, wherein m is an integer greater than 1), a queue pool scheduling unit 403, a fusion switching unit 405 and x network interface unit(s) (x network interface unit(s) is(are) a network interface unit 406-1, . . . , a network interface unit 406-x, wherein x is an integer greater than or equal to 1). The network card sharing device 400 also includes two sharing acceleration units (these two sharing acceleration units are a sharing acceleration unit 407-1 and a sharing acceleration unit 407-2). The resource sharing system in FIG. 4 also shows two external networks: an external network 408-1 and an external network 408-2.

Assuming the network card drivers that corresponds the virtual network card unit 404-1 and the virtual network card unit 404-2 run on the VM 41-1, and the sharing device driver of the sharing acceleration unit 407-1 runs on the VM 41-5, when the network card driver corresponding to the virtual network card unit 404-1 needs to send a data frame, the server interface unit 402-1 obtains the data frame from the VM 41-1 as well as relevant description information for sending the data frame, constructs a first fusion descriptor according to the relevant description information, and schedules the constructed first fusion descriptor and the data frame to the virtual network card unit 404-1 through the queue pool scheduling unit 403.

The virtual network card unit 404-1 processes the data frame according to the first fusion descriptor, and encapsulates the data frame by the fusion switching format, and then sends the encapsulated data frame to the fusion switching unit 405.

The fusion switching unit 405 determines whether the data frame in the fusion switching format is sent to a virtual network card unit, or an interface unit or the management unit 401 according to a local forwarding relationship table sent by the management unit 401 or a forwarding relationship table stored in the management unit 401.

(1) Assuming the encapsulated data frame is forwarded to the network interface unit 406-2, the network interface unit 406-2 restores the data frame in the fusion switching format to be the data frame before encapsulation that has been processed by the virtual network card unit 404-1 according to the first fusion descriptor, and sends the restored data frame to an external network.

(2) Assuming the encapsulated data frame is forwarded to the virtual network card unit 404-5, the virtual network card unit 404-5 restores the data frame in the fusion switching format to be the data frame, constructs a second fusion descriptor for the restored data frame, and schedules the restored data frame and the second fusion descriptor to a corresponding server interface unit (such as the server interface unit 402-5). There is a virtual network card driver of the virtual network card unit 404-5 running on the VM that is hosted on the server connecting with the server interface unit 402-5.

The server interface unit 402-5 writes the contents of the second fusion descriptor and the data frame into the corresponding VM in the server, so that the VM processes the data frame by using the contents of the second fusion descriptor.

(3) Assuming the encapsulated data frame is forwarded to the management unit 401, the management unit 401 restores the data frame in the fusion switching format, processes and sends the restored data frame.

When the VM 41-1 needs to migrate from the server 1 to the server n, the specific process is as follows.

The VM 41-1 disables the sending function of its virtual network card driver, the network card sharing device prevents the virtual network card unit 404-1 and the virtual network card unit 404-2 from receiving the data frames sent by the external network.

The queue pool scheduling unit completes the sending and receiving of the data frame.

The server 1 copies a software scene of the VM 41-1 into the same operation system of the destination VM. The network card sharing device copies scenes of the virtual network card unit 404-1 and the virtual network card unit 404-2 (including configuration information, e.g., which server the virtual network card unit corresponds to, a network card address, a network format, etc.) into a destination virtual network card unit and a destination fusion switching unit on a destination network card sharing device.

The sending and receiving functions of the virtual network card driver on the destination VM and the destination virtual network card unit are started. At this point, the migration of the VM is ended.

In specific implementation, a VM migrates from a server to another server, and the server before the migration and the server after the migration may be not connected with a same network card sharing device. Hence, all the relevant contents need to be copied from a source network card sharing device into a destination network card sharing device.

Because the sharing device driver of the sharing acceleration unit 407-1 runs on the VM 41-5, when receiving a data frame sent by the VM 41-5, the sharing acceleration unit 407-1 processes the data frame though a floating point technology, encryption/decryption, compression/decompression, graphic image processing, etc., and sends processed data frame back to the VM 41-5 of the server n. When the sharing acceleration unit 407-1 is with a communication function, the processed data frame is encapsulated by the fusion switching format and then sent to the fusion switching unit 405.

The data forwarding device of the present disclosure is illustrated by the above examples. An example of the device composed of hardware architectures is given below.

Figure 5:
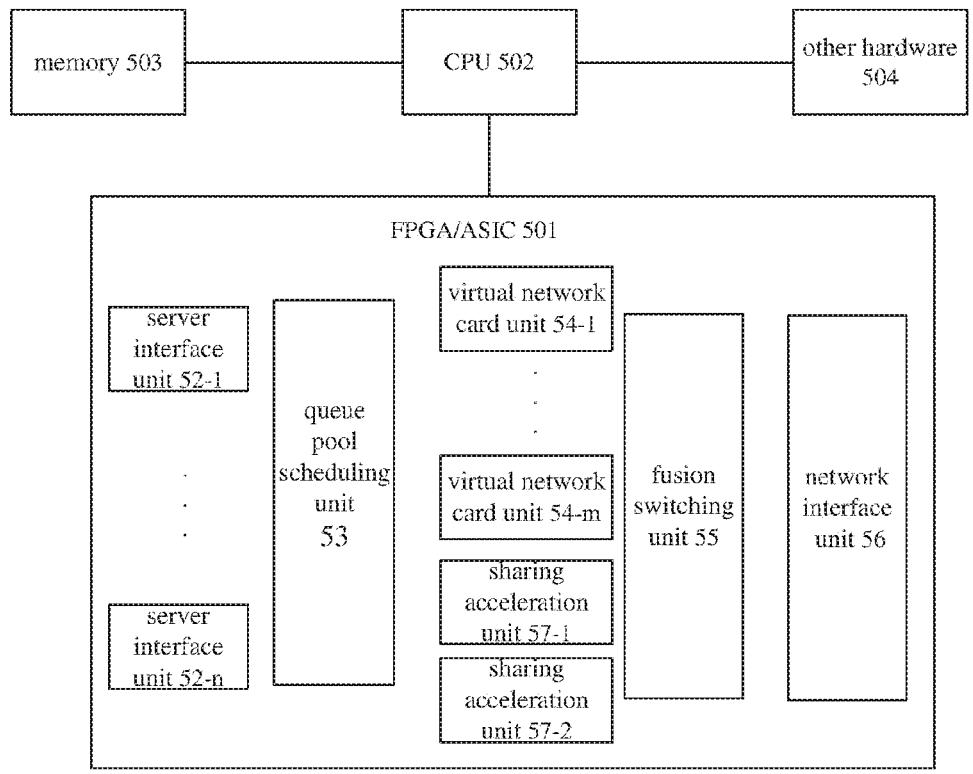
FIG. 5 is an example of a schematic diagram showing a device composed of hardware architectures according to the present disclosure.

This device may be a programmable device combining the software and the hardware. Referring to FIG. 5, FIG. 5 is a schematic diagram showing a device composed of hardware architectures according to an example of the present disclosure, in which a FPGA/ASIC 501 and a central processing unit (CPU) system are included.

The FPGA/ASIC 501 is to complete functions of such units as n server interface units (n server interface units are a server interface unit 52-1, . . . , a server interface unit 52-n respectively), a queue pool scheduling unit 53, m virtual network card units (m virtual network card units are a virtual network card unit 54-1, . . . , a virtual network card unit 54-m respectively), a fusion switching unit 55, a network interface unit 56 and an acceleration unit, which will not be not described redundantly herein. In this example, two acceleration units are shown: a sharing acceleration unit 57-1 and a sharing acceleration unit 57-2, respectively.

The CPU system connecting with the FPGA/ASIC 501, which includes a CPU 502, a memory 503 necessary for normal operations and other hardware 504, is to complete the functions of the management unit in the device.

Any one of the server interface units is to obtain the data frame and the descriptor for sending the data frame that sent by the VM running on its corresponding server, construct the first fusion descriptor and send the data frame and the first fusion descriptor to the queue pool scheduling unit 53. Any one of the server interface units is also to obtain the data frame and the second fusion descriptor from the queue pool scheduling unit 53, and to write the obtained data frame and the contents of the second fusion descriptor into its corresponding server.

The queue pool scheduling unit 53 is to schedule the data frame sent by the server interface unit and the first fusion descriptor to a virtual network card unit through a queue, and to schedule the data frame and the second fusion descriptor to a corresponding server interface unit through a queue when receiving the second fusion descriptor sent by the virtual network card unit.

When receiving the data frame and the first fusion descriptor scheduled by the queue pool scheduling unit 53, any one of virtual network card units processes the data frame according to the first fusion descriptor, encapsulates the processed data frame by the fusion switching format, and sends the encapsulated data frame to the fusion switching unit 55. When receiving the data frame in the fusion switching format sent by the fusion switching unit 55, any one of virtual network card units restores the data frame in the fusion switching format and constructs the second fusion descriptor for the restored data frame, and sends the restored data frame and the constructed second fusion descriptor to the server interface unit.

When receiving the data frame in the fusion switching format sent by a virtual network card unit or the network interface unit 56, the fusion switching unit 55 is to send the data frame in the fusion switching format to a virtual network card unit or the network interface unit 56 or the CPU 502 according to the forwarding relationship table.

When receiving the data frame in the fusion switching format sent by the fusion switching unit 55, the network interface unit 56 is to restore the data frame in the fusion switching format and to forward the restored data frame to an external network. When receiving the data frame sent by the external network, the network interface unit 56 is to encapsulate the data frame by the fusion switching format and to send the encapsulated data frame to the fusion switching unit 55.

The CPU 502 is to configure the forwarding relationship table, the corresponding relationship between the VLAN identity and the network format, the network format, the corresponding relationship between the network node identity and the MAC address, and the scheduling policy (e.g., the transmission rate or the priority) and the current state for each queue in the queue pool scheduling unit 53, and to store the configuration information into the memory 503 and/or store the forwarding relationship table, the corresponding relationship between the VLAN identity and the network format, the network format, the corresponding relationship between the network node identity and the MAC address into the network interface unit 56 and a virtual network card unit. Or, the CPU 502 is to store the scheduling policy (e.g., the transmission rate or the priority) and the current state for each queue into the queue pool scheduling unit 53. The CPU 502 may communicate with the external network or the server via the fusion switching unit 55. E.g., the CPU 502 may send the data frame to or receive the data frame from the external network or the server via the fusion switching unit 55.

The device shown in FIG. 5 is just a specific example, and the above functions may be implemented through other structures which are different from that described in this example. E.g., Part of the functions of the FPGA/ASIC 501 may be implemented by adopting a program running on the CPU 502; or a common network card(s) connecting with the CPU 502 may be adopted instead of the network interface unit.

In this example, by a plurality of virtual network card units in the network card sharing device, the sending and receiving of the data frame on each server is completed, and a plurality of servers share resources. When the forwarding of the data frame is implemented in the present disclosure, neither the first fusion descriptor nor the second fusion descriptor includes the starting address of the buffer space, i.e., the first fusion descriptor and the second fusion descriptor are not associated with the IO address of the CPU, and a correlation between the VM and the virtual network card is reduced, so the migration of the VM can easily be achieved.

Figure 6:
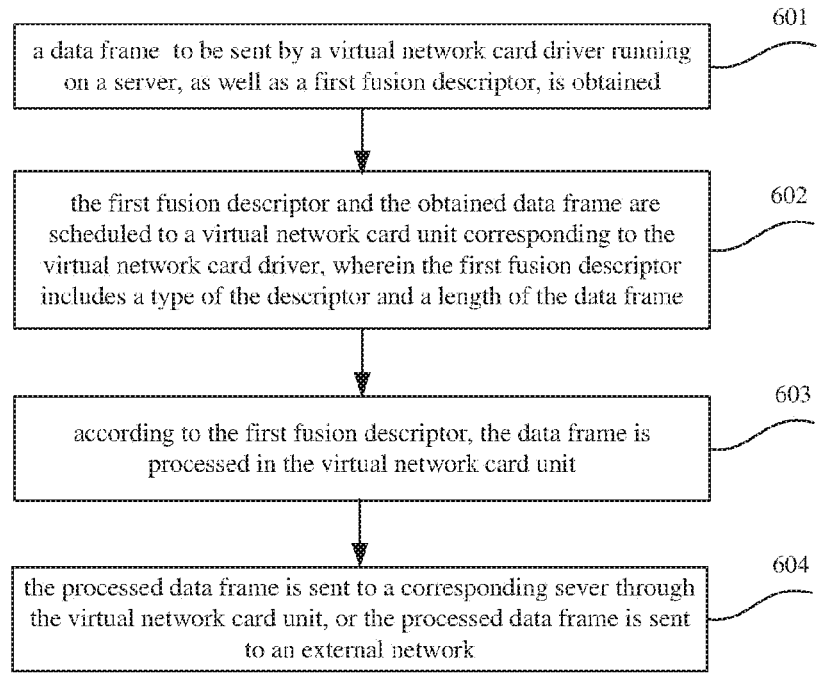
FIG. 6 is an example of a schematic flowchart of a data forwarding method according to the present disclosure.

Based on the same idea, a data forwarding method is also provided by the present disclosure. FIG. 6 is an example of a schematic flowchart of a data forwarding method provided by the present disclosure, which may be implemented by the data forwarding device of the above examples and will not be described repeatedly herein. The method, executed by a network card sharing device, may be applied to a network system (such as the resource sharing system mentioned above) including a plurality of severs and the network card sharing device where there are a plurality of virtual network cards and the forwarding relationship table may be established. There may be one or a plurality of virtual network card drivers running on each server, and each virtual network card driver has a one-to-one correspondence with each virtual network card unit.

The process for data forwarding shown in FIG. 6 is as below.

At block 601, a data frame to be sent by a virtual network card driver running on a server, as well as a first fusion descriptor, is obtained.

At block 602, the first fusion descriptor and the obtained data frame are scheduled to a virtual network card unit corresponding to the virtual network card driver, wherein the first fusion descriptor includes a type of the descriptor and a length of the data frame.

At block 603, according to the first fusion descriptor, the data frame is processed in the virtual network card unit.

At block 604, the processed data frame is sent to a corresponding sever through the virtual network card unit, or the processed data frame is sent to an external network.

Figure 7:
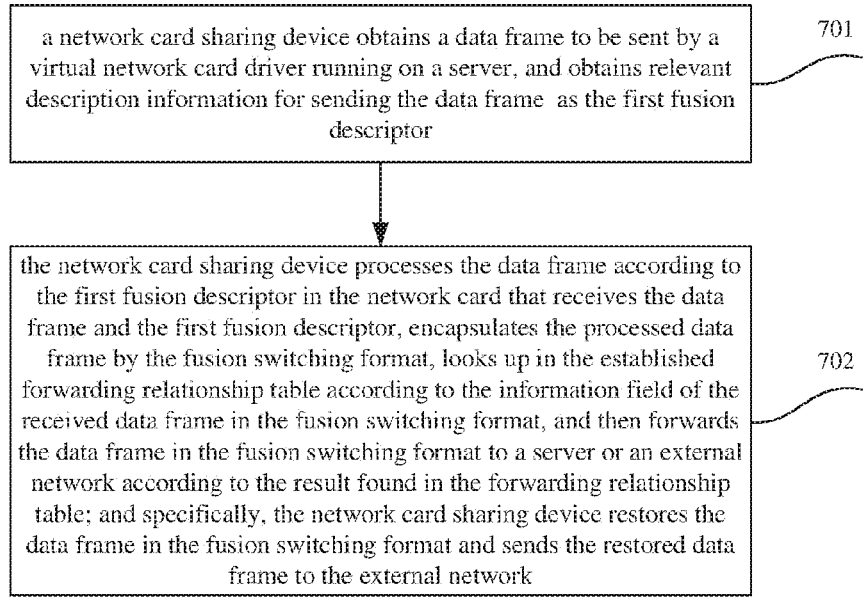
FIG. 7 is an example of a schematic flowchart of a processing method for receiving a data frame sent by a server according to the present disclosure.

As an example, referring to FIG. 7, FIG. 7 is an example of a schematic flowchart of a processing method for receiving a data frame sent by a server according to the present disclosure, and a specific process is as below.

At block 701, a network card sharing device obtains a data frame to be sent by a virtual network card driver running on a server as well as a first fusion descriptor (e.g., relevant description information for sending the data frame is taken as the first fusion descriptor), and schedules the first fusion descriptor and the data frame to a virtual network card corresponding to the virtual network card driver that sends the data frame.

The first fusion descriptor includes a type of the descriptor and a length of the data frame. The first fusion descriptor may also include one of or any combination of following contents: a frame format of the data frame, whether to add or modify network node ID information, whether to recalculate a checksum, whether to encrypt the data frame, other information for guiding the virtual network card unit on how to process the data frame.

When the network card sharing device connects with the server by the PCI Express point-to-point connection mode, the method further includes that the network card sharing device, as a downstream endpoint of a PCI Express link, configures a plurality of sending engines and receiving engines, which are in one-to-one correspondence with queues.

At block 701, the process of obtaining the data frame to be sent by the virtual network card driver running on the server and obtaining the relevant description information for sending the data frame as the first fusion descriptor includes: reading the data frame to be sent from a memory of the server according to a current valid sending buffer descriptor pointed by a sending engine, constructing contents of the sending buffer descriptor except the starting address of the buffer space as the first fusion descriptor, and scheduling the first fusion descriptor and the data frame to a corresponding virtual network card through a queue corresponding to the sending engine.

When the network card sharing device connects with the server by the Ethernet point-to-point connection mode, the method further includes that the network card sharing device configures a plurality of sending engines and receiving engines, which are in one-to-one correspondence with queues.

The process of obtaining the data frame to be sent by the virtual network card driver running on the server and obtaining the relevant description information for sending the data frame as the first fusion descriptor includes: when a sending engine receives a descriptor sent by the sever and the data frame, changing a format of the descriptor sent by the sever into the format of a first fusion descriptor, and sending the first fusion descriptor and the data frame to a corresponding queue.

At block 702, the network card sharing device processes the data frame according to the first fusion descriptor in the network card that receives the data frame and the first fusion descriptor, encapsulates the processed data frame by the fusion switching format, looks up in the established forwarding relationship table according to the information field of the received data frame in the fusion switching format, and then forwards the data frame in the fusion switching format to a server or an external network according to the result found in the forwarding relationship table. When it is determined that the data frame in the fusion switching format is sent to the external network, the data frame in the fusion switching format is directly restored and sent to the external network.

The fusion switching format may be the Ethernet format, the MPLS format, the IP format or the proprietary format defined by the system.

Figure 8:
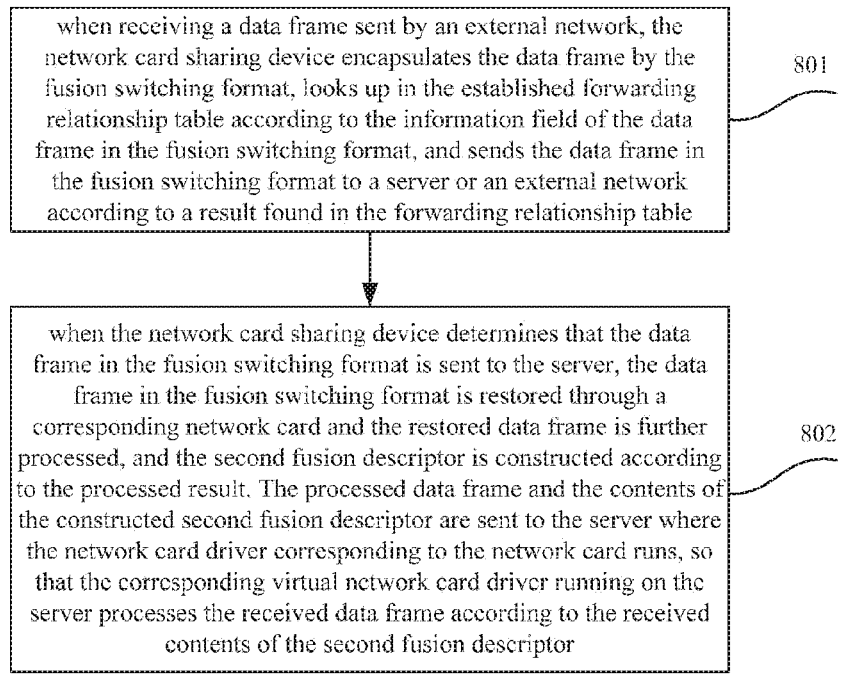
FIG. 8 is an example of a schematic flowchart of a processing method for receiving a data frame sent by an external network according to the present disclosure.

As another example, referring to FIG. 8, FIG. 8 is an example of a schematic flowchart of a processing method for receiving a data frame sent by an external network according to the present disclosure, and a specific process is as below.

At block 801, when receiving a data frame sent by an external network, the network card sharing device encapsulates the data frame by the fusion switching format, looks up in the established forwarding relationship table according to the information field of the data frame in the fusion switching format, and sends the data frame in the fusion switching format to a server or an external network according to a result found in the forwarding relationship table.

At block 802, when the network card sharing device determines that the data frame in the fusion switching format is sent to the server, the data frame in the fusion switching format is restored through a corresponding network card and the restored data frame is further processed, and the second fusion descriptor is constructed according to the processed result. The processed data frame and the contents of the constructed second fusion descriptor are sent to the server where the network card driver corresponding to the network card runs, so that the corresponding virtual network card driver running on the server processes the received data frame according to the received contents of the second fusion descriptor.

The second fusion descriptor includes at least a type of the descriptor and a length of the data frame.

The second fusion descriptor may also include one of or any combination of following contents: a frame format of the data frame, whether there is an error, a judging result of the field of the data frame from the virtual network card unit, information of the data frame extracted or discarded by the virtual network card unit, modification of the data frame performed by the virtual network card unit, whether the virtual network card unit completes the decryption process, other information discovered or has been processed by the virtual network card unit.

When the network card sharing device connects with the server by the PCI Express point-to-point connection mode, the method further includes that the network card sharing device, as a downstream endpoint of a PCI Express link, configures a plurality of sending engines and receiving engines, which corresponds with queues, respectively.

At block 802, the process of sending the data frame and the contents of the constructed second fusion descriptor to the server where the network card driver corresponding to the network card runs, to make the corresponding virtual network card driver running on the server process the received data frame according to the received contents of the second fusion descriptor, includes: reading the second fusion descriptor when there are the data frame and the second fusion descriptor in a queue corresponding to a receiving engine, reading the subsequent data frame according to the second fusion descriptor, writing the data frame into a buffer of a server pointed by the receiving buffer descriptor, and carrying the contents of the second fusion descriptor when writing back the receiving buffer descriptor.

When the network card sharing device connects with the server by the Ethernet point-to-point connection mode, the method further includes that the network card sharing device configures a plurality of sending engines and receiving engines, which corresponds with queues, respectively.

At block 802, the process of sending the data frame and the contents of the constructed second fusion descriptor to the server where the network card driver corresponding to the network card runs, to make the corresponding virtual network card driver running on the server process the received data frame according to the received contents of the second fusion descriptor, includes: reading the second fusion descriptor when there are the data frame and the second fusion descriptor in a queue corresponding to a receiving engine, reading the subsequent data frame according to the second fusion descriptor, sending the data frame and the second fusion descriptor to a corresponding server, so that the corresponding virtual network card driver running on the server further processes the data frame and the second fusion descriptor.

According to the preset scheduling policy (e.g., the transmission rate or the priority), the network card sharing device may also discard part of the data frame, or schedule the received data frame to the virtual network card or the server.

The method further includes: presetting the network format and the corresponding relationship between the network node ID and the MAC address.

The process of encapsulating the data frame by the fusion switching format includes: when the fusion switching format is the Ethernet format, and the received data frame sent by the external network is not the Ethernet data frame, matching a corresponding MAC address in the configured network format and corresponding relationship between the network node ID and the MAC address, extending the source network node ID to a 48-bit source network node ID and determining the 48-bit source network node ID as the source MAC address, using the matched MAC address as the destination MAC address, and encapsulating the data from by the Ethernet format according to the destination MAC address and the source MAC address.

The method further includes: allocating different VLAN IDs for different network formats.

The process of encapsulating the data frame by the fusion switching format includes: when the fusion switching format is the Ethernet format, and the received data frame sent by the external network is not the Ethernet data frame, matching a VLAN ID according to the network format of the data frame, extending the source network node ID of the data frame to a 48-bit source network node ID and determining the 48-bit source network node ID as the source MAC address, extending the destination network node ID of the data frame to a 48-bit destination network node ID and determining the 48-bit destination network node ID as the destination MAC address, and encapsulating the data from by the Ethernet format according to the destination MAC address, the source MAC address and the matched VLAN ID.

In this example, a virtual environment of a plurality of VMs on each server may be implemented by the VMM. There is one virtual network card driver or a plurality of virtual network card drivers running on each VM, and each virtual network card driver is in one-to-one correspondence with the virtual network card unit.

At block 701, the process of obtaining the data frame to be sent by the virtual network card driver running on the server and obtaining the relevant description information for sending the data frame as the first fusion descriptor includes: obtaining the data frame to be sent by the virtual network card driver running on the VM of the server, obtaining the relevant description information for sending the data frame as the first fusion descriptor, and sending the first fusion descriptor and the obtained data frame to the virtual network card corresponding to the virtual network card driver that sends the data frame.

At block 802, the process of sending the data frame and the contents of the constructed second fusion descriptor to the server where the network card driver corresponding to the network card runs, to make the corresponding virtual network card driver running on the server process the received data frame according to the received contents of the second fusion descriptor, includes: sending the data frame and the contents of the second fusion descriptor to the VM where the virtual network card driver corresponding to the virtual network card that sends the data frame runs, so that the corresponding virtual network card driver running on the VM processes the received data frame according to the received contents of the second fusion descriptor.

When the network card sharing device learns the migration of any one VM, the network card sharing device disables the function of receiving the data frame sent by the external network on the virtual network card unit that corresponds to the virtual network card driver running on the VM, completes the forwarding of the received data frame, copies the relevant contents of the virtual network card into a destination network card that corresponds to a virtual network card driver running on the migrated VM.

The sending and receiving function of the destination virtual network card unit is started when the virtual network card driver on the migrated VM is launched.

In this example, the network card sharing device may be further configured with a sharing acceleration function, and the method further includes as follows.

When receiving a data frame sent by a sever which runs a sharing device driver, the network card sharing device processes the data frame and returns a processed result to the server that sends the data frame. When the network card sharing device is with a network communication function, the processed result is sent to an external network or sent to the server that sends the data frame.

In conclusion, by a plurality of virtual network card units in the network card sharing device, there is one or a plurality of the virtual network card drivers running on each server that are in one-to-one correspondence with the virtual network card units, and a data frame sent by a server is forwarded to an external network or other server(s) via the network card sharing device, which enables a plurality of servers to share network card resources.

When the forwarding of the data frame is implemented in the present disclosure, neither the first fusion descriptor nor the second fusion descriptor includes the starting address of the buffer space, i.e., the first fusion descriptor and the second fusion descriptor are not associated with the TO address of the CPU, and a correlation between the VM and the network card is reduced, so it is easier to realize the resource sharing among a plurality servers where there are virtual VMs, and it is convenient for the migration of the VM.

The sharing acceleration unit is also added in the network card sharing device, which corresponds to the sharing driver running on an operation system of the server or the VM, so as to realize acceleration processing function for the server or the VM on the server to increase the processing speed of the server.

What is claimed is:

1. A data forwarding device, comprising: a plurality of server interfaces, a plurality of virtual network cards, a fusion switch and a network interface, wherein a server interface of the plurality of server interfaces obtains a data frame sent by a virtual network card driver running on a server corresponding to the server interface and obtains a first fusion descriptor, and sends the first fusion descriptor and the data frame to a virtual network card that corresponds to the virtual network card driver, wherein the first fusion descriptor comprises a type of the descriptor and a length of the data frame;

the virtual network card processes the data frame according to the first fusion descriptor, and sends the data frame to the fusion switch; and the fusion switch sends the data frame to a corresponding server via a virtual network card, or sends the data frame to an external network via a network interface.

2. The device according to claim 1, wherein the virtual network card encapsulates the data frame with a fusion switching format when the fusion switching format is an Ethernet format and the format of the data frame is not the Ethernet data frame, and to send the data frame in the fusion switching format to the fusion switch;

the fusion switch searches for a corresponding outgoing interface identity in a forwarding relationship table according to an information field of the data frame in the fusion switching format, and sends the data frame in the fusion switching format to a virtual network card or the network interface according to the outgoing interface identity; and the network interface restores the data frame in the fusion switching format when receiving the data frame in the fusion switching format sent by the fusion switch, and to send the data frame to the external network.

3. The device according to claim 2, wherein the network interface receives the data frame sent by the external network, encapsulate the data frame sent by the external network by the fusion switching format when a format of the data frame sent by the external network is not the Ethernet format, and sends the data frame in the fusion switching format to the fusion switch;

the fusion switch searches for a corresponding outgoing interface identity in the forwarding relationship table according to an information field of the data frame in the fusion switching format when receiving the data frame in the fusion switching format sent by the network interface, and sends the data frame in the fusion switching format to a virtual network card or the network interface according to the found outgoing interface identity;

the network card restores the data frame in the fusion switching format when receiving the data frame in the fusion switching format sent by the fusion switch, processes the data frame and constructs a second fusion descriptor according to a processed result, and sends the processed data frame and the second fusion descriptor to a server interface that corresponds to the network card that sends the second fusion descriptor, wherein the second fusion descriptor comprises a type of the descriptor and a length of the data frame; and the server interface sends the data frame and contents of the second fusion descriptor to its corresponding server.

4. The device according to claim 3, wherein the device further comprises a queue pool scheduler, and the queue pool scheduler, according to a scheduling policy configured for a queue in the queue pool scheduler and a current state of the queue, discards part of the data frame, or schedules the data frame to a corresponding virtual network card or a corresponding server interface.

5. The device according to claim 4, wherein when connecting with a corresponding server by a peripheral component interconnection bus interface (PCI Express) point-to-point connection mode, the server interface configures a sending engine and a receiving engine that are in one-to-one correspondence with queues configured in the queue pool scheduler, and further reads the data frame according to a current valid sending buffer descriptor pointed by the sending engine when the virtual network card driver needs to send the data frame, constructs the first fusion descriptor in which a starting address of a buffer space is not included, writes the first fusion descriptor and the data frame into a queue corresponding to the sending engine in the queue pool scheduler, and further reads a current valid receiving buffer descriptor from the server by the receiving engine, reads the second fusion descriptor when there are the data frame and the second fusion descriptor in a queue corresponding to the receiving engine, reads the data frame according to the second fusion descriptor, writes the data frame into a buffer of the server pointed by the receiving buffer descriptor, and carries the contents of the second fusion descriptor when writing back the receiving butler descriptor.

6. The device according to claim 4, wherein when connecting with a corresponding server via an Ethernet point-to-point connection mode, the server interface configures a sending engine and a receiving engine that are in one-to-one correspondence with queues configured in the queue pool scheduler, and constructs the first fusion descriptor according to a descriptor sent by the server when the sending engine receives the descriptor sent by the server and the data frame, and sends the first fusion descriptor and the data frame to a queue corresponding to the sending engine in the queue pool scheduler, and reads the second fusion descriptor by the receiving engine when there are the data frame and the second fusion descriptor in a queue corresponding to the receiving engine, reads the data frame according to the second fusion descriptor, and sends the second fusion descriptor and the data frame to the corresponding server.

7. The device according to claim 4, wherein the network interface, when the fusion switching format is the Ethernet format and the data frame sent by the external network is not an Ethernet data frame, determines a virtual local area network identity (VLAN ID) according to a network format of the data frame, determines a destination medium access control (MAC) address according to a destination network node ID of the data frame and the network format, determines a source MAC address according to a source network node ID, and encapsulates the data frame with the Ethernet format according the VLAN ID, the destination MAC address and the source MAC address; or the virtual network card, when the fusion switching format is the Ethernet format and the data frame sent by the queue pool scheduler is not an Ethernet data frame, determines a virtual local area network identity (VLAN ID) according to a network format of the data frame, determines a destination MAC address according to a destination network node ID of the data frame and the network format, determines a source MAC address according to a source network node ID, and encapsulates the data frame with the Ethernet format according to the VLAN ID, the destination MAC address and the source MAC address.

8. The device according to claim 3, wherein the server runs the virtual network card driver through a virtual machine (VM) and the device further comprises a manager, wherein the manager disables a function of receiving the data frame sent by the external network on the virtual network card that corresponds to the virtual network card driver running on the VM when learning migration of the VM on the server, makes the queue pool scheduler complete the sending and receiving of the data frame and copies configuration information of the virtual network card where the receiving function is disabled to a destination virtual network card that corresponds to a virtual network card driver running on a migrated VM, and starts a sending and receiving function of the destination virtual network card when the virtual network card driver on the migrated VM is launched.

9. A data forwarding method executed by a data forwarding device comprising a plurality of virtual network cards and the method comprises:

obtaining a data frame sent by a virtual network card driver running on a server and a first fusion descriptor;

scheduling the first fusion descriptor and the data frame to a virtual network card that corresponds to the virtual network card driver, wherein the first fusion descriptor comprises a type of the descriptor and a length of the data frame;

processing the data frame according to the first fusion descriptor in the virtual network card; and sending the data frame to a corresponding server via a virtual network card, or sending the data frame to an external network.

10. The method according to claim 9, wherein processing the data frame according to the first fusion descriptor in the virtual network card comprises:

encapsulating the data frame by a fusion switching format in the virtual network card when a format of the data frame is not the fusion switching format; and wherein sending the data frame to an external network comprises:

searching for a corresponding outgoing interface identity in a forwarding relationship table according to an information field of the data frame in the fusion switching format, restoring the data frame in the fusion switching format after it is determined that the outgoing interface corresponds to the external network, and sending the data frame to the external network.

11. The method according to claim 10, further comprising:

receiving the data frame sent by the external network;

encapsulating the data frame sent by the external network with the fusion switching format when a format of the data frame sent by the external network is not the Ethernet format;

searching for a corresponding outgoing interface identity in the forwarding relationship table according to an information field of the data frame in the fusion switching format;

sending the data frame in the fusion switching format to a corresponding virtual network card according to the found outgoing interface identity;

restoring the data frame in the fusion switching format, processing the data frame and constructing a second fusion descriptor according to a processed result in the virtual network card, wherein the second fusion descriptor comprises a type of the descriptor and a length of the data frame; and sending the data frame and contents of the second fusion descriptor to its corresponding server.

12. The method according to claim 11, wherein the data forwarding device connects with the server through a peripheral component interconnection bus interface (PCI Express) point-to-point connection mode and the method further comprises:

configuring a sending engine and a receiving engine that are in one-to-one correspondence with queues;

wherein obtaining the data frame sent by a virtual network card driver running on a server and a first fusion descriptor comprises:

reading the data frame according to a current valid sending buffer descriptor pointed by the sending engine when the virtual network card driver needs to send the data frame and constructing the first fusion descriptor in which a starting address of a buffer space is not included, and writing the first fusion descriptor and the data frame into a queue corresponding to the sending engine; and wherein sending the data frame and contents of the second fusion descriptor to its corresponding server comprises:

reading a current valid receiving buffer descriptor from the server by the receiving engine, and reading the second fusion descriptor when there are the data frame and the second fusion descriptor in a queue corresponding to the receiving engine, writing the data frame into a buffer of the server pointed by the receiving buffer descriptor, and carrying the contents of the second fusion descriptor when writing back the receiving buffer descriptor.

13. The method according to claim 11, wherein the data forwarding device connects with the server via an Ethernet point-to-point connection mode and the method further comprises:

configuring a sending engine and a receiving engine that are in one-to-one correspondence with queues;

wherein obtaining the data frame sent by a virtual network card driver running on a server and a first fusion descriptor comprises:

constructing the first fusion descriptor according to a descriptor sent by the server when the sending engine receives the descriptor sent by the server and the data frame, and sending the first fusion descriptor and the data frame to a queue corresponding to the sending engine; and wherein sending the data frame and contents of the second fusion descriptor to its corresponding server comprises:

reading the second fusion descriptor by the receiving engine when there are the data frame and the second fusion descriptor in a queue corresponding to the receiving engine, reading the data frame according to the second fusion descriptor, and sending the second fusion descriptor and the data frame to the corresponding server.

14. The method according to claim 11, wherein encapsulating the data frame sent by the external network by the fusion switching format when a format of the data frame sent by the external network is not the Ethernet format comprises:
  determining a virtual local area network identity (VLAN ID) according to a network format of the data frame when the fusion switching format is the Ethernet format and the data frame sent by the external network is not an Ethernet data frame, determining a destination media access control (MAC) address according to a destination network node ID of the data frame and the network format, determining a source MAC address according to a source network node ID, and encapsulating the data frame with the Ethernet format according to the VLAN ID, the destination MAC address and the source MAC address; and
  wherein encapsulating the data frame by a fusion switching format in the virtual network card when a format of the data frame is not the fusion switching format comprises:
    determining a virtual local area network identity (VLAN ID) according to a network format of the data frame when the fusion switching format is the Ethernet format and the data frame is not an Ethernet data frame; determining a destination MAC address according to a destination network node ID of the data frame and the network format, determining a source MAC address according to a source network node ID, and encapsulating the data frame with the Ethernet format according to the VLAN ID, the destination MAC address and the source MAC address.

15. The method according to claim 11, wherein the server runs the virtual network card driver through a virtual machine (VM) and the method further comprises:
  disabling a function of receiving the data frame sent by the external network on the virtual network card that corresponds to the virtual network card driver running on the VM when learning migration of the VM on the server;
  completing the sending and receiving of the data frame and copying configuration information of the virtual network card where the receiving function is disabled to a destination virtual network card that corresponds to a virtual network card driver running on a migrated VM; and
  starting a sending and receiving function of the destination virtual network card when the virtual network card driver on the migrated VM is launched.

* * * * *